United States Patent
Zou et al.

(10) Patent No.: US 9,680,814 B2
(45) Date of Patent: Jun. 13, 2017

(54) METHOD, DEVICE, AND SYSTEM FOR REGISTERING TERMINAL APPLICATION

(71) Applicant: HUAWEI TECHNOLOGIES CO., LTD., Shenzhen, Guangdong (CN)

(72) Inventors: Xianjun Zou, Shenzhen (CN); Xin Yin, Shenzhen (CN); Liang Li, Shenzhen (CN); Zijun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 14/586,237

(22) Filed: Dec. 30, 2014

(65) Prior Publication Data

US 2015/0180851 A1    Jun. 25, 2015

Related U.S. Application Data

(63) Continuation of application No. PCT/CN2014/083794, filed on Aug. 6, 2014.

(30) Foreign Application Priority Data

Dec. 25, 2013 (CN) .......................... 2013 1 0727135

(51) Int. Cl.
*H04L 29/06* (2006.01)
*H04L 29/08* (2006.01)
*H04L 9/32* (2006.01)

(52) U.S. Cl.
CPC ............. *H04L 63/08* (2013.01); *H04L 9/32* (2013.01); *H04L 9/3226* (2013.01); *H04L 63/0838* (2013.01)

(58) Field of Classification Search
CPC ......... H04L 63/08; H04L 9/32; H04L 9/3226; H04L 67/02
See application file for complete search history.

(56) References Cited

U.S. PATENT DOCUMENTS 7,600,262 B2 * 10/2009 Nomura .................. G06F 21/00
                                                     713/189
8,700,006 B2 *  4/2014 Ni .......................... G06Q 30/02
                                                     455/414.1

(Continued)

FOREIGN PATENT DOCUMENTS

CN          101697538           4/2010
CN          102695146           9/2012

(Continued)

OTHER PUBLICATIONS

PCT International Search Report dated Nov. 4, 2014 in corresponding International Patent Application No. PCT/CN2014/083794.

(Continued)

*Primary Examiner* — Linglan Edwards
(74) *Attorney, Agent, or Firm* — Staas & Halsey LLP

(57) ABSTRACT

Embodiments of the present invention disclose a method, a device, and a system for registering a terminal application. In the embodiments of the present invention, a download address information recommending request that is sent by a first terminal and carries a terminal identifier of a second terminal is received; and recommended download address information is returned to the first terminal, where the recommended download address information includes a terminal application download address and authentication information used for performing registration, so that the first terminal sends, to the second terminal, a recommending message carrying the recommended download address information, so as to make the second terminal register according to the terminal application download address and the authentication information used for performing registration. In this solution, less time is consumed and a registration success rate is high, which helps to improve an application activating rate for a user.

14 Claims, 9 Drawing Sheets

(56) References Cited

U.S. PATENT DOCUMENTS

| | | | | |
|---|---|---|---|---|
| 9,001,980 B2* | 4/2015 | Pearl | ............... | H04M 7/0024 |
| | | | | 379/88.17 |
| 9,071,950 B2* | 6/2015 | Mairs | ............... | H04L 67/14 |
| 9,117,229 B2* | 8/2015 | Setton | ............... | G06Q 30/0277 |
| 9,276,932 B2* | 3/2016 | Hoy | ............... | H04L 63/0884 |
| 2008/0270578 A1* | 10/2008 | Zhang | ............... | H04L 63/0807 |
| | | | | 709/219 |
| 2010/0005517 A1* | 1/2010 | Foti | ............... | H04N 21/25875 |
| | | | | 726/6 |
| 2011/0219236 A1* | 9/2011 | Wang | ............... | G06F 21/10 |
| | | | | 713/176 |
| 2011/0300834 A1* | 12/2011 | Ni | ............... | G06Q 30/02 |
| | | | | 455/414.1 |
| 2014/0122608 A1* | 5/2014 | Liu | ............... | H04L 67/104 |
| | | | | 709/204 |

FOREIGN PATENT DOCUMENTS

| | | |
|---|---|---|
| CN | 103297484 | 9/2013 |
| CN | 103747423 | 4/2014 |
| EP | 1 976 181 A1 | 10/2008 |
| EP | 2 667 647 A1 | 11/2013 |
| WO | 2008/001988 A1 | 1/2008 |

OTHER PUBLICATIONS

Extended European Search Report dated Sep. 28, 2016 in corresponding European Patent Application No. 14875030.0 (8 pages).
Chinese Office Action dated May 18, 2016 in corresponding Chinese Patent Application No. 201310727135.3.

* cited by examiner

METHOD, DEVICE, AND SYSTEM FOR REGISTERING TERMINAL APPLICATION

CROSS-REFERENCE TO RELATED APPLICATIONS

This application is a continuation of International Application No. PCT/CN2014/083794, filed on Aug. 6, 2014, which claims priority to Chinese Patent Application No. 201310727135.3, filed on Dec. 25, 2013, both of which are hereby incorporated by reference in their entireties.

TECHNICAL FIELD

The present invention relates to the field of communications technologies, and specifically to a method, a device, and a system for registering a terminal application.

BACKGROUND

With the rapid development of communications technologies, various terminal applications undergo increasingly development as well. In order to promote the terminal applications, when a user uses a terminal application, the terminal application generally provides an SMS message recommending function, so as to make it easy for the user to recommend information, such as a download address of the terminal application, to a friend by using an SMS message, so that a user receiving a recommendation may download the terminal application by using the download address in the SMS message. However, after the user receiving the recommendation downloads the terminal application, the user often still needs to perform registration.

In the prior art, the following two manners are generally used to perform registration: one is downlink SMS message registration and the other one is uplink SMS message registration. In the downlink SMS message registration solution, generally, an application server acquires a mobile number of the user and delivers authentication code to the user according to the mobile number, and then, the user sends a registration request to the application server according to the authentication code so as to accomplish a service registration process. In the uplink SMS message registration solution, the application server provides the user with an address of an SMS message gateway after receiving a registration request from the user, the user then sends an uplink SMS message to the application server through the SMS message gateway according to the address of the SMS message gateway, and after acquiring the uplink SMS message, the application server compares content of the SMS message with the registration request sent from a client for verification, and if the verification succeeds, permits the user to perform service registration.

In a process of studying and practicing the prior art, the inventor of the present invention finds that, in both the two existing solutions, a user is required to interact with the application server for multiple times by using SMS messages, so as to verify (or determine) an identity of the user, relatively long time is consumed, and a registration success rate is relatively low, which is not beneficial to improving an application activating rate of the user.

SUMMARY

Embodiments of the present invention provide a method, a device, and a system for registering a terminal application. According to the embodiments of the present invention, less time is consumed, and a registration success rate is high, thereby helping to improve an application activating rate for a user.

According to a first aspect, an embodiment of the present invention provides a method for registering a terminal application, including:

receiving a download address information recommending request sent by a first terminal, where the download address information recommending request carries a terminal identifier of a second terminal;

according to the download address information recommending request, acquiring a terminal application download address and generating authentication information used for performing registration, and according to the terminal application download address and the authentication information used for performing registration, generating recommended download address information, where the recommended download address information includes the terminal application download address and the authentication information used for performing registration; and returning the recommended download address information to the first terminal, so that the first terminal sends, to the second terminal, a recommending message carrying the recommended download address information, so as to make the second terminal register according to the terminal application download address and the authentication information used for performing registration.

In a first possible implementation manner, with reference to the first aspect, after the returning the recommended download address information to the first terminal, the method further includes:

receiving a download request sent by the second terminal according to the terminal application download address;

returning an installation package of a terminal application to the second terminal according to the download request, so that the second terminal installs the terminal application;

receiving a registration request message sent by the second terminal, where the registration request message carries a terminal identifier of the first terminal and the authentication information;

performing authentication according to the terminal identifier of the first terminal and the authentication information; and returning registration information to the second terminal when the authentication succeeds.

In a second possible implementation manner, with reference to the first possible implementation manner of the first aspect, after the according to the download address information recommending request, acquiring a terminal application download address and generating authentication information used for performing registration, the method further includes:

recording a mapping relationship between the authentication information, the terminal identifier of the first terminal, and the terminal identifier of the second terminal.

In a third possible implementation manner, with reference to the second possible implementation manner of the first aspect, the performing authentication according to the terminal identifier of the first terminal and the authentication information includes:

determining whether the terminal identifier of the first terminal, the authentication information, and the terminal identifier of the second terminal are consistent with the recorded mapping relationship;

if consistent, the authentication succeeds; and if inconsistent, the authentication fails.

In a fourth possible implementation manner, with reference to the first aspect, the first, second, or third possible implementation manner of the first aspect, the registration information includes the terminal identifier of the second terminal and an authentication key, and after the returning registration information to the second terminal, the method further includes:

receiving a login request sent by the second terminal according to the terminal identifier of the second terminal and the authentication key; and authenticating a login operation according to the login request, and returning a login response to the second terminal.

According to a second aspect, an embodiment of the present invention further provides a method for registering a terminal application, including:

receiving a recommending message sent by a first terminal, where the recommending message carries recommended download address information, and the recommended download address information includes a terminal application download address and authentication information used for performing registration;

downloading a terminal application from an application server according to the terminal application download address, and installing the terminal application;

when the terminal application is enabled, acquiring a terminal identifier of the first terminal, generating a registration request according to the terminal identifier of the first terminal and the authentication information used for performing registration, and sending a registration request message to the application server, where the registration request message carries the terminal identifier of the first terminal and the authentication information; and receiving registration information returned after the application server performs authentication according to the terminal identifier of the first terminal and the authentication information.

In a first possible implementation manner, with reference to the second aspect, the when the terminal application is enabled, acquiring a terminal identifier of the first terminal, and generating a registration request according to the terminal identifier of the first terminal and the authentication information used for performing registration includes:

when the terminal application is enabled, acquiring the terminal identifier of the first terminal and extracting the authentication information used for performing registration from the recommending message; and generating the registration request according to the terminal identifier of the first terminal and the authentication information used for performing registration, where the registration request message carries the terminal identifier of the first terminal and the authentication information.

In a second possible implementation manner, with reference to the second aspect or the first possible implementation manner of the second aspect, the registration information includes a terminal identifier of a second terminal and an authentication key, and after the receiving registration information returned after the application server performs authentication according to the terminal identifier of the first terminal and the authentication information, the method further includes:

sending a login request to the application server according to the terminal identifier of the second terminal and the authentication key; and receiving a login response returned by the application server according to the login request.

According to a third aspect, an embodiment of the present invention further provides a device configured for registration, including a receiving unit, a generating unit, and a sending unit; where the receiving unit is configured to receive a download address information recommending request sent by a first terminal, where the download address information recommending request carries a terminal identifier of a second terminal;

the generating unit is configured to: according to the download address information recommending request that is received by the receiving unit, acquire a terminal application download address and generate authentication information used for performing registration, and according to the terminal application download address and the authentication information used for performing registration, generate recommended download address information, where the recommended download address information includes the terminal application download address and the authentication information used for performing registration; and the sending unit is configured to return the recommended download address information to the first terminal, so that the first terminal sends, to the second terminal, a recommending message carrying the recommended download address information, so as to make the second terminal register according to the terminal application download address and the authentication information used for performing registration.

In a first possible implementation manner, with reference to the third aspect, the device configured for registration further includes an authentication unit; where the receiving unit is further configured to receive a download request sent by the second terminal according to the terminal application download address;

the sending unit is further configured to return an installation package of a terminal application to the second terminal according to the download request, so that the second terminal installs the terminal application;

the receiving unit is further configured to receive a registration request message sent by the second terminal, where the registration request message carries a terminal identifier of the first terminal and the authentication information;

the authentication unit is configured to: perform authentication according to the terminal identifier of the first terminal and the authentication information, when the authentication fails, send a response message representing that the authentication fails to the second terminal by using the sending unit, and when the authentication succeeds, return registration information to the second terminal by using the sending unit; and the sending unit is further configured to: when the authentication fails, send the response message representing that the authentication fails to the second terminal, and when the authentication succeeds in the authentication unit, return the registration information to the second terminal.

In a second possible implementation manner, with reference to the first possible implementation manner of the third aspect, the device configured for registration further includes a recording unit; where the recording unit is configured to record a mapping relationship between the authentication information, the terminal identifier of the first terminal, and the terminal identifier of the second terminal.

In a third possible implementation manner, with reference to the second possible implementation manner of the third aspect, the authentication unit is specifically configured to determine whether the terminal identifier of the first terminal, the authentication information, and the terminal identifier of the second terminal are consistent with the recorded mapping relationship; if consistent, the authentication succeeds; and if inconsistent, the authentication fails.

In a fourth possible implementation manner, with reference to the third aspect, the first, second or third possible implementation manner of the third aspect, the receiving unit is further configured to receive a login request sent by the second terminal according to the registration information, where the registration information includes the terminal identifier of the second terminal and an authentication key; and the sending unit is further configured to authenticate a login operation according to the login request, and return a login response to the second terminal.

According to a fourth aspect, an embodiment of the present invention provides a terminal, including a receiving unit, a download unit, a generating unit, and a sending unit; where the receiving unit is configured to receive a recommending message sent by a first terminal, where the recommending message carries recommended download address information, and the recommended download address information includes a terminal application download address and authentication information used for performing registration;

the download unit is configured to download a terminal application from an application server according to the terminal application download address, and install the terminal application;

the generating unit is configured to, when the terminal application is enabled, acquire a terminal identifier of the first terminal, and generate a registration request according to the terminal identifier of the first terminal and the authentication information used for performing registration, where the registration request message carries the terminal identifier of the first terminal and the authentication information; and the sending unit is configured to send the registration request message to the application server; and the receiving unit is further configured to receive registration information returned after the application server performs authentication according to the terminal identifier of the first terminal and the authentication information.

In a first possible implementation manner, with reference to the fourth aspect, the generating unit is specifically configured to, when the terminal application is enabled, acquire the terminal identifier of the first terminal, extract the authentication information used for performing registration from the recommending message, and generate the registration request according to the terminal identifier of the first terminal and the authentication information used for performing registration, where the registration request message carries the terminal identifier of the first terminal and the authentication information.

In a second possible implementation manner, with reference to the fourth aspect or the first possible implementation manner of the fourth aspect, the sending unit is further configured to send a login request to the application server according to the registration information, where the registration information includes a terminal identifier of a second terminal and an authentication key; and the receiving unit is further configured to receive a login response returned by the application server according to the login request.

According to a fifth aspect, an embodiment of the present invention further provides a communications system, including any device configured for registration provided in the embodiments of the present invention and any terminal provided in the embodiments of the present invention.

In the embodiments of the present invention, a download address information recommending request that is sent by a first terminal and carries a terminal identifier of a second terminal is received; then according to the download address information recommending request, a terminal application download address is acquired and authentication information used for performing registration is generated; and recommended download address information is returned to the first terminal, where the recommended download address information includes the terminal application download address and the authentication information used for performing registration, so that the first terminal sends, to the second terminal, a recommending message carrying the recommended download address information, so as to make the second terminal register according to the terminal application download address and the authentication information used for performing registration. In this solution, because the first terminal that has registered may acquire the authentication information, and the authentication information is carried in the recommending message when the recommending message is sent to the second terminal, the second terminal may directly initiate registration according to the authentication information, during which a user does not need to interact with an application server for multiple times by using SMS messages. Therefore, compared with that in the prior art, in this solution, less time is consumed, and a registration success rate is high, thereby helping to improve an application activating rate for the user, and further saving expense of the user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

Embodiments of the present invention provide a method, a device, and a system for registering a terminal application, which are described separately in detail as follows.

The embodiment describes the method from a perspective of a device configured for registration, where the device configured for registration may specifically be an application server, for instance.

The method for registering a terminal application includes: receiving a download address information recommending request sent by a first terminal, where the download address information recommending request carries a terminal identifier of a second terminal; according to the download address information recommending request, acquiring a terminal application download address and generating authentication information used for performing registration, and returning recommended download address information to the first terminal, where the recommended download address information includes the terminal application download address and the authentication information used for performing registration, so that the first terminal sends, to the second terminal, a recommending message carrying the recommended download address information; receiving a download request sent by the second terminal according to the terminal application download address; returning an installation package of a terminal application to the second terminal according to the download request, so that the second terminal installs the terminal application; receiving a registration request message sent by the second terminal, where the registration request message carries a terminal identifier of the first terminal and the authentication information; performing authentication according to the terminal identifier of the first terminal and the authentication information; and returning registration information to the second terminal when the authentication succeeds.

Figure 1A:
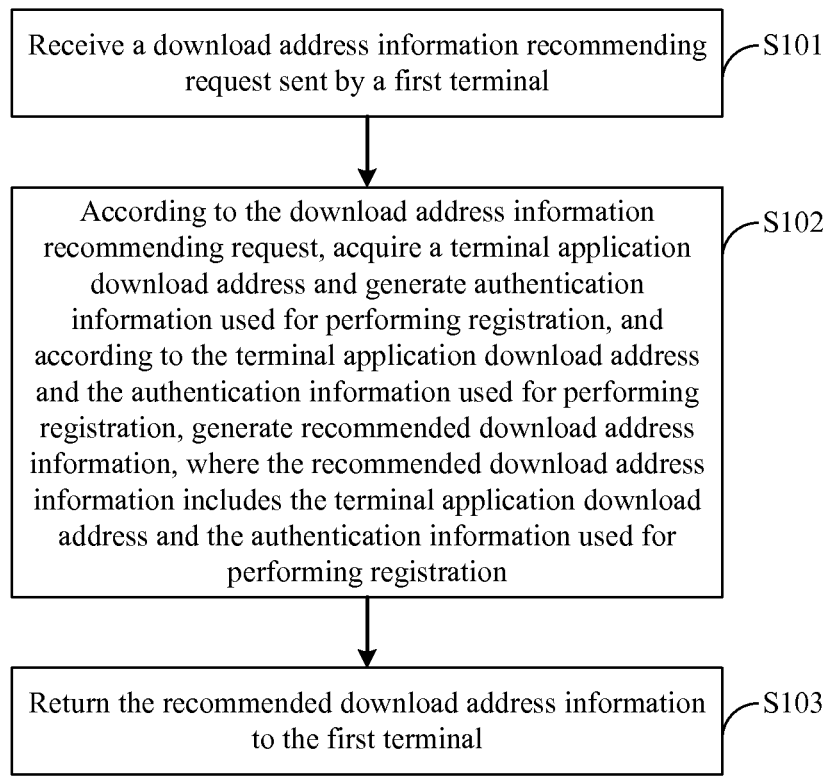
FIG. 1a is a flowchart of a method for registering a terminal application according to an embodiment of the present invention.

As shown in FIG. 1a, the embodiment of the present invention provides a method for registering a terminal application, where the method may be applied to an application server, and a specific process may include the following steps:

S101: Receive a download address information recommending request sent by a first terminal.

The download address information recommending request may carry information, such as a terminal identifier of a second terminal. The terminal identifier of the second terminal may be acquired by the first terminal, and the terminal identifier may specifically be represented in various forms, such as an international mobile subscriber identity (IMSI), a mobile subscriber international integrated services digital network number (MSISDN, Mobile Subscriber International ISDN/PSTN number), and a national mobile subscriber identity (NMSI). A mobile phone is used as an example, and these terminal identifiers may be called mobile numbers.

S102: According to the received download address information recommending request, acquire a terminal application download address and generate authentication information used for performing registration, and according to the terminal application download address and the authentication information used for performing registration, generate recommended download address information, where the recommended download address information includes the terminal application download address and the authentication information used for performing registration.

After the authentication information used for performing registration is generated, a mapping relationship between the authentication information, a terminal identifier of the first terminal, and the terminal identifier of the second terminal may further be recorded.

S103: Return the recommended download address information to the first terminal.

The recommended download address information may include the terminal application download address and the authentication information used for performing registration, so that the first terminal sends, to the second terminal, a recommending message carrying the recommended download address information, so as to make the second terminal register according to the terminal application download address and the authentication information used for performing registration. In other words, when a subsequent sender terminal recommends the terminal application to the second terminal, the recommended download address information may be carried in the recommending message. In this way, not only the terminal application download address can be provided for the second terminal, but also the authentication information used for performing registration is also provided for the second terminal at the same time, so that the second terminal does not need to acquire the authentication information used for performing registration again.

It may be learned from the above that, in this embodiment, a download address information recommending request that is sent by a first terminal and carries a terminal identifier of a second terminal is received; then according to the download address information recommending request, a terminal application download address is acquired and authentication information used for performing registration is generated; and recommended download address information is returned to the first terminal, where the recommended download address information includes the terminal application download address and the authentication information used for performing registration, so that the first terminal sends, to the second terminal, a recommending message carrying the recommended download address information, so as to make the second terminal register according to the terminal application download address and the authentication information used for performing registration. In this solution, because the first terminal that has registered may acquire the authentication information, and the authentication information is carried in the recommending message when the recommending message is sent to the second terminal, the second terminal may directly initiate registration according to the authentication information, during which a user does not need to interact with an application server for multiple times by using SMS messages. Therefore, compared with that in the prior art, in this solution, less time is consumed, and a registration success rate is high, thereby helping to improve an application activating rate for the user, and further saving expense of the user.

In addition, after the recommended download address information is returned to the first terminal (that is, step S103), the method for registering a terminal application may further include steps S104 to S108.

Figure 1B:
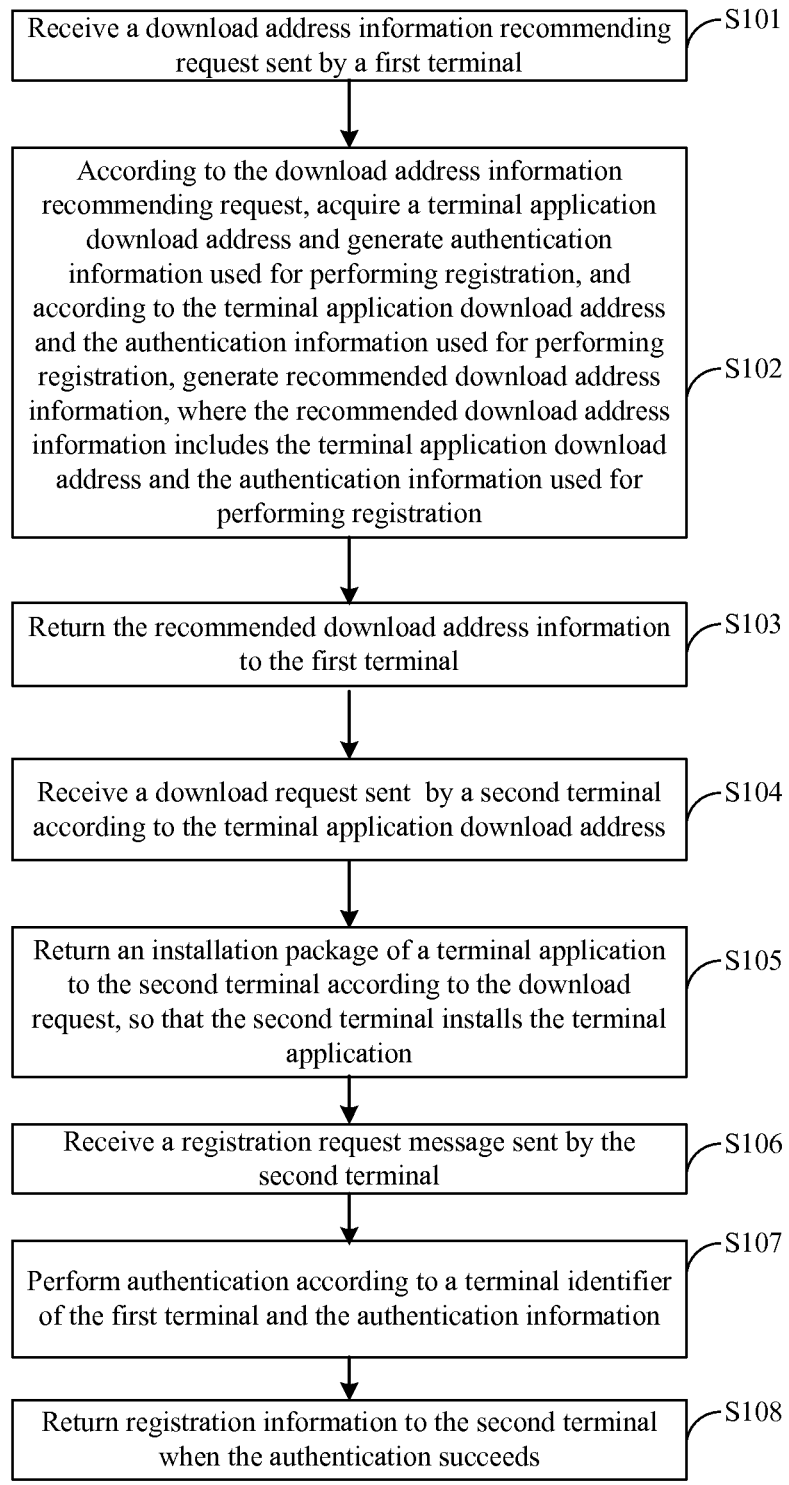
FIG. 1b is another flowchart of a method for registering a terminal application according to an embodiment of the present invention.

As shown in FIG. 1b, a specific process of a method for registering a terminal application may be as follows:

For S101 to S103, reference may be made to the foregoing embodiment, and therefore no further details are provided herein.

S104: Receive a download request sent by a second terminal according to the terminal application download address.

After receiving the recommending message sent by the first terminal, the second terminal may download the terminal application according to the terminal application download address in the recommended download address information which is carried in the recommending message, for example, the second terminal may send the download request to a network device, such as an application server, according to the terminal application download address.

S105: Return an installation package of a terminal application to the second terminal according to the received download request, so that the second terminal installs the terminal application.

S106: Receive a registration request message sent by the second terminal.

The registration request message may carry the terminal identifier of the first terminal and the authentication information, where the authentication information is the authentication information included in the recommended download address information, which is not repeatedly described herein.

S107: Perform authentication according to a terminal identifier of the first terminal and the authentication information, when the authentication succeeds, perform step S108, and when the authentication fails, perform no action or return a response message about that the authentication fails to the second terminal. For example, the step "perform authentication according to the terminal identifier of the first terminal and the authentication information" may specifically be as follows:

Determine whether the terminal identifier of the first terminal, the authentication information, and the terminal identifier of the second terminal are consistent with the recorded mapping relationship; if consistent, it indicates that an identity of the user (that is, the second terminal) that requests registration is authorized and the authentication succeeds, perform step S108; and if inconsistent, it indicates that the identity of the user (that is, the second terminal) that requests registration is unauthorized and the authentication fails, in this case, perform no action or return the response message about that the authentication fails to the second terminal.

S108: Return registration information to the second terminal when the authentication succeeds.

The registration information may include information, such as the terminal identifier of the second terminal and an authentication key (servicetoken), and in this case, after the registration information is returned to the second terminal, the method may further include:

receiving a login request sent by the second terminal according to the terminal identifier of the second terminal and the authentication key, authenticating a login operation according to the login request, and returning a login response to the second terminal, which is not repeatedly described herein.

The authentication key is an initial password by which the user logs in to an account of the terminal application.

It may be learned from the above that, in this embodiment, a download address information recommending request that is sent by a first terminal and carries a terminal identifier of a second terminal is received; then according to the download address information recommending request, a terminal application download address is acquired and authentication information used for performing registration is generated; recommended download address information is returned to the first terminal, where the recommended download address information includes the terminal application download address and the authentication information used for performing registration, so that the first terminal sends, to the second terminal, a recommending message carrying the recommended download address information; thereafter, a download request sent by the second terminal according to the terminal application download address may be received; an installation package of a terminal application may be returned to the second terminal, so that the second terminal installs the terminal application; a registration request message that is sent by the second terminal and carries a terminal identifier of the first terminal and the authentication information is received; authentication is performed according to the terminal identifier of the first terminal and the authentication information; and registration information is returned to the second terminal when the authentication succeeds. In this solution, because the first terminal that has registered may acquire the authentication information, and the authentication information is carried in the recommending message when the recommending message is sent to the second terminal, the second terminal may directly initiate registration according to the authentication information, during which a user does not need to interact with an application server for multiple times by using SMS messages. Therefore, compared with that in the prior art, in this solution, less time is consumed, and a registration success rate is high, thereby helping to improve an application activating rate for the user, and further saving expense of the user.

An embodiment of the present invention further provides a method for registering a terminal application, where the method may be applied to a terminal, and the terminal may specifically be a device, such as a smart phone or a tablet computer. The terminal may be used as a second terminal in this embodiment of the present invention.

The method for registering a terminal application includes: receiving a recommending message that is sent by a first terminal and carries recommended download address information, where the recommended download address information includes a terminal application download address and authentication information used for performing registration; downloading a terminal application from an application server according to the terminal application download address, and installing the terminal application;

when the terminal application is enabled, sending, to the application server, a registration request message carrying a terminal identifier of the first terminal and the authentication information; and receiving registration information returned after the application server performs authentication according to the terminal identifier of the first terminal and the authentication information.

Figure 2:
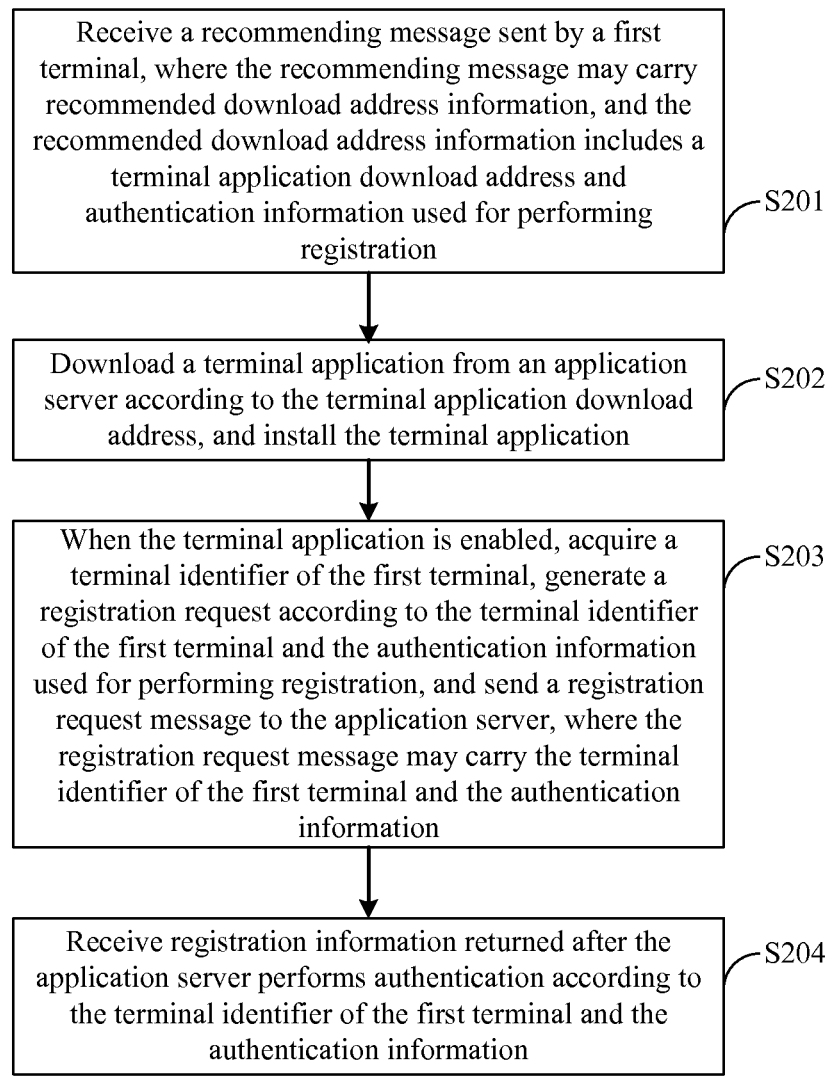
FIG. 2 is still another flowchart of a method for registering a terminal application according to an embodiment of the present invention.

As shown in FIG. 2, the embodiment of the present invention provides a method for registering a terminal application, where the method may be applied to a second terminal, and a specific process may be as follows:

S201: Receive a recommending message sent by a first terminal.

The recommending message may specifically be in an information format, such as an SMS message, a multimedia message, or a WeChat message, and the recommending message may carry recommended download address information, where the recommended download address information may include information, such as a terminal application download address and authentication information used for performing registration.

S202: Download a terminal application from an application server according to a terminal application download address, and install the terminal application. For example, the step may specifically be as follows:

Send a download request to a device at a network side (for example, an application server) according to the terminal application download address, receive an installation package of the terminal application returned by the device at the network side (for example, the application server) according to the download request, and run the installation package of the terminal application, so as to install the terminal application.

S203: When the terminal application is enabled, acquire a terminal identifier of the first terminal, generate a registration request according to the terminal identifier of the first terminal and authentication information used for performing registration, and send a registration request message to the application server, where the registration request message may carry information, such as the terminal identifier of the first terminal and the authentication information (namely, the authentication information carried in the recommending message). For example, the step may specifically be as follows:

When the terminal application is enabled, acquire the terminal identifier of the first terminal, extract the authentication information used for performing registration from the recommending message, generate the registration request according to the terminal identifier of the first terminal and the authentication information used for performing registration, and send the registration request message to the application server, where the registration request carries the terminal identifier of the first terminal and the authentication information used for performing registration.

The terminal identifier may specifically be represented in various forms, such as an IMSI, an MSISDN, and an NMSI. The enabling of the terminal application may be that a user actively enables the terminal application and may also be that the terminal application is automatically enabled, for example, the terminal application is wakened up by listening to a network switch broadcast.

S204: Receive registration information returned after the application server performs authentication according to the terminal identifier of the first terminal and the authentication information.

The registration information may include information, such as a terminal identifier of the second terminal and an authentication key, and in this way, after receiving the registration information, the second terminal may perform a login operation according to the registration information, that is, after the step "receive registration information returned after the application server performs authentication according to the terminal identifier of the first terminal and the authentication information" (namely, step 204), the method for registering a terminal application may further include:

performing a login operation according to the registration information, which, for example, may specifically be as follows:

sending a login request to the application server according to the terminal identifier of the second terminal and the authentication key; and receiving a login response returned by the application server according to the login request, which is not repeatedly described herein.

It may be learned from the above that, in this embodiment, a second terminal may receive a recommending message that is sent by a first terminal and carries recommended download address information, where the recommended download address information includes a terminal application download address and authentication information used for performing registration, so as to enable the second terminal to, on the one hand, download a terminal application for installation from an application server according to the terminal application download address, and on the other hand, directly initiate registration to the application server according to the authentication information when the terminal application is enabled, while a user does not need to interact with the application server for multiple times by using SMS messages to acquire the authentication information. Therefore, compared with that in the prior art, in this solution, less time is consumed, and occurrence of a case in which the registration fails due to an error in a step in the multiple times of interaction can be avoided, so as to improve a registration success rate, thereby helping to improve an application activating rate for the user, and further saving expense of the user.

An embodiment of the present invention further provides another method for registering a terminal application, where the method may be applied to a terminal, and the terminal may specifically be a device, such as a smart phone or a tablet computer. The terminal may specifically be used as a first terminal in this embodiment of the present invention.

The method for registering a terminal application includes: acquiring a terminal identifier of a second terminal, sending, to an application server, a download address information recommending request carrying the terminal identifier of the second terminal, receiving recommended download address information returned by the application server according to the download address information recommending request, where the recommended download address information includes a terminal application download address and authentication information used for performing registration, and sending, to the second terminal, a recommending message carrying the recommended download address information, so as to make the second terminal download a terminal application from the application server according to the terminal application download address and perform registration.

Figure 3:
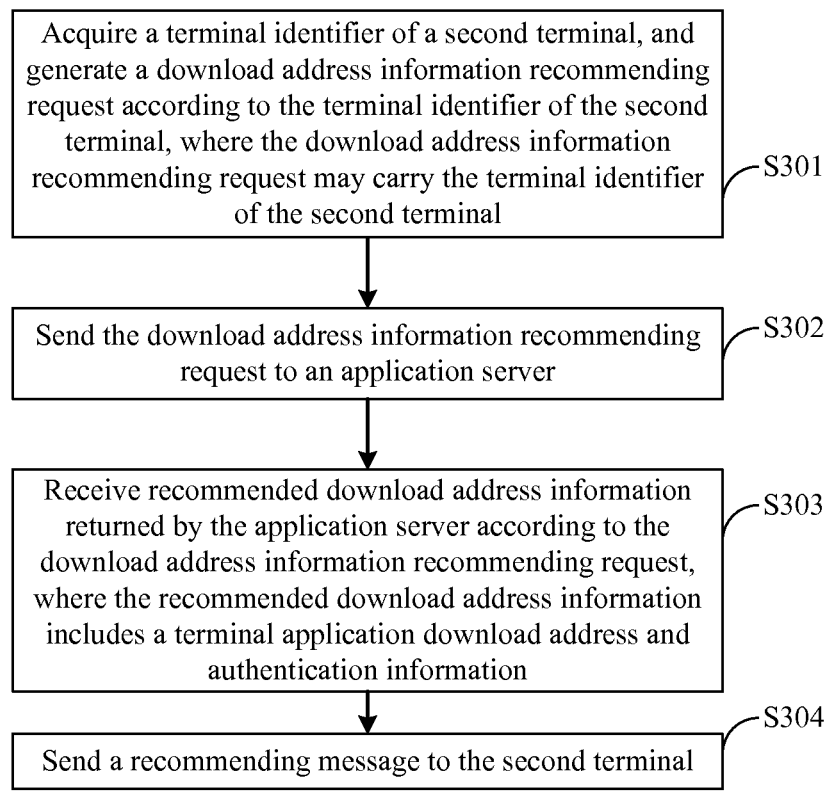
FIG. 3 is still another flowchart of a method for registering a terminal application according to an embodiment of the present invention.

A method for registering a terminal application is shown in FIG. 3, where the method may be applied to a first terminal, and a specific process may be as follows:

S301: Acquire a terminal identifier of a second terminal, and generate a download address information recommending request according to the terminal identifier of the second terminal.

The download address information recommending request may carry information, such as the terminal identifier of the second terminal. The terminal identifier may specifically be represented in various forms, such as an IMSI, an MSISDN, and an NMSI.

S302: Send the download address information recommending request to an application server.

S303: Receive recommended download address information returned by the application server according to the download address information recommending request.

The recommended download address information may include a terminal application download address and authentication information used for performing registration.

S304: Send a recommending message to the second terminal.

The recommending message may carry the recommended download address information, so as to make the second terminal download a terminal application from the application server according to the recommended download address and perform registration. For details, reference may be made to the Embodiment 2, and therefore no further details are provided herein.

It may be learned from the above that, in this embodiment, a first terminal may acquire a terminal identifier of a second terminal, generate a download address information recommending request according to the terminal identifier of the second terminal, then send, to an application server, the download address information recommending request carrying the terminal identifier of the second terminal, so as to acquire recommended download address information, where the recommended download address information includes a terminal application download address and authentication information used for performing registration. In this way, a recommending message carrying the recommended download address information may be sent to the second terminal, so that the second terminal may download a terminal application from the application server according to the recommended download address and directly initiate registration to the application server according to the authentication information, while a user does not need to interact with the application server for multiple times by using SMS messages to acquire the authentication information. Therefore, compared with that in the prior art, in this solution, less time is consumed, and occurrence of a case in which the registration fails due to an error in a step in the multiple times of interaction can be avoided, so as to improve a registration success rate, thereby helping to improve an application activating rate for the user, and further saving expense of the user.

According to the methods described in the foregoing embodiments, the following further describes the present invention in detail with examples.

In an embodiment, an example, in which a first terminal specifically is a terminal A, a second terminal specifically is a terminal B, a terminal application specifically is a terminal application K, and a device configured for registration specifically is an application server, is used for description.

Figure 4A:
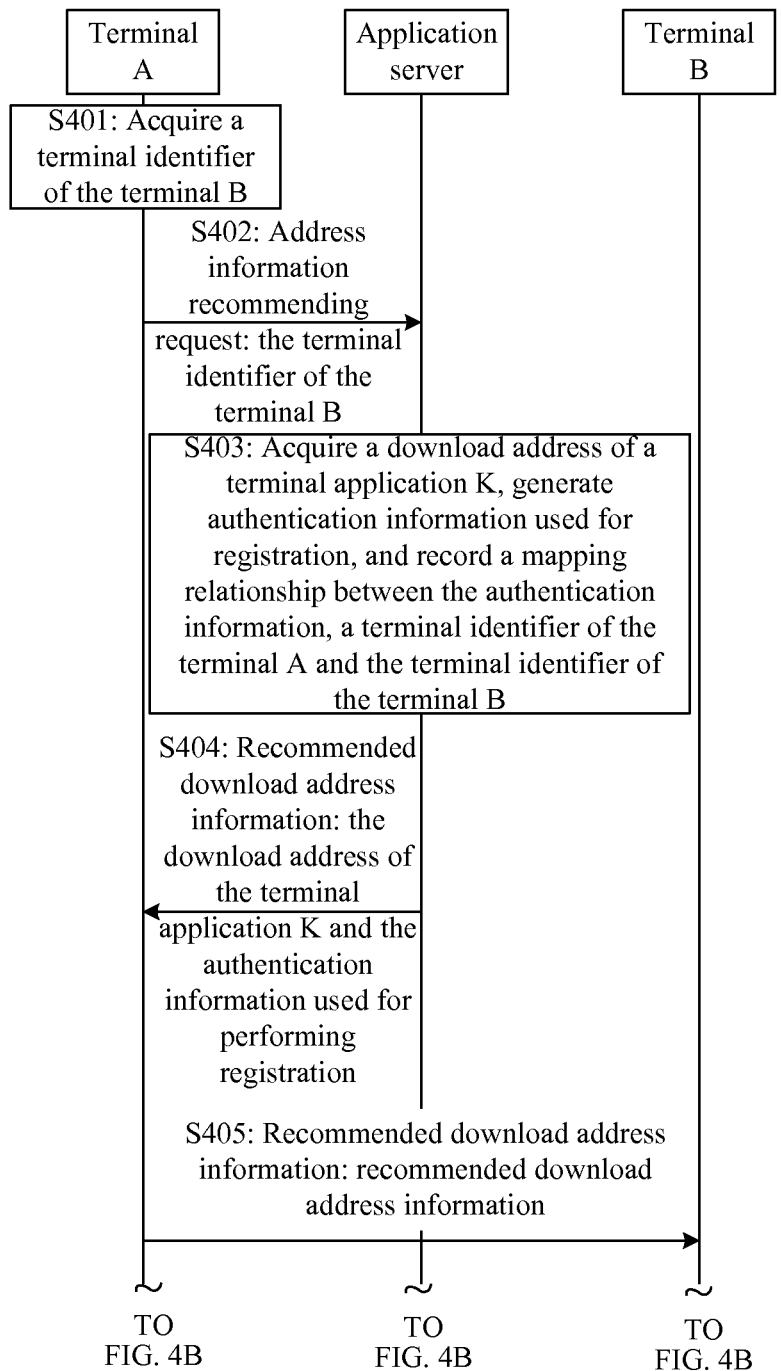
FIG. 4A and FIG. 4B are a still another flowchart of a method for registering a terminal application according to an embodiment of the present invention.
Figure 4B:
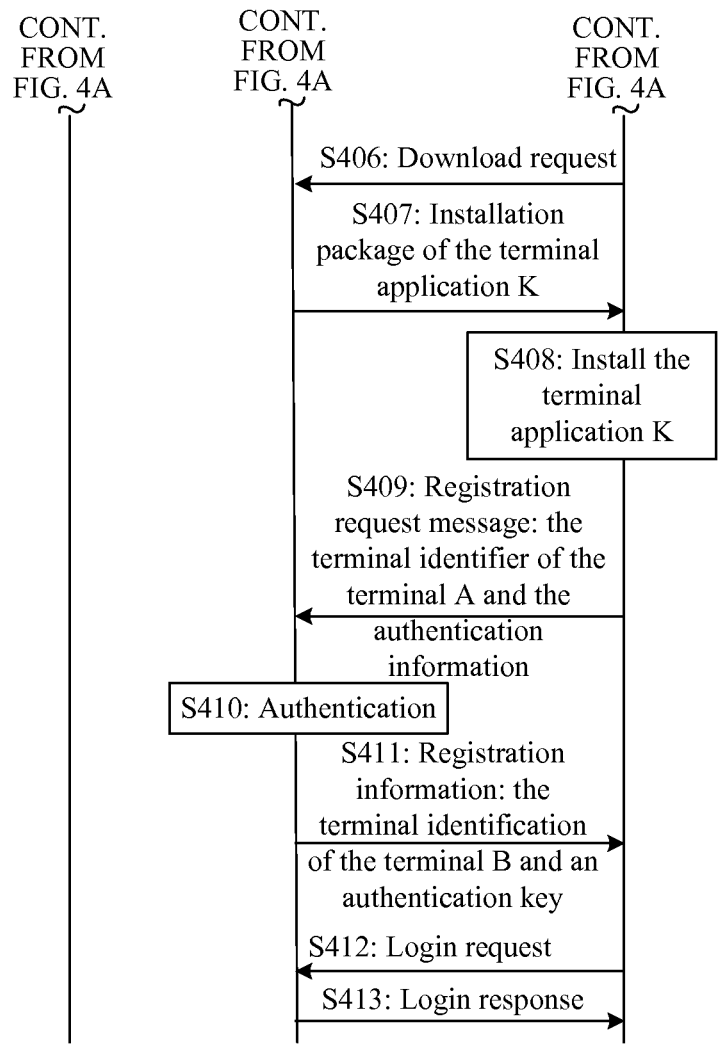

As shown in FIG. 4A and FIG. 4B, a specific process of a method for registering a terminal application may be as follows:

S401: The terminal A acquires a terminal identifier of the terminal B when determining that a recommending message about the terminal application K needs to be sent to the terminal B.

For example, using that the terminal A and the terminal B specifically are mobile phones as an example, the terminal A may acquire the terminal identifier, such as a mobile number, of the terminal B. The terminal A is a registered user of the terminal application K, and the terminal B is an unregistered user of the terminal application K.

S402: The terminal A generates a download address information recommending request according to the terminal identifier of the terminal B, and sends the download address information recommending request to the application server.

The download address information recommending request may carry information, such as the terminal identifier of the terminal B, for example, using that the terminal A and the terminal B are mobile phones as an example, the download address information recommending request may carry information, such as the mobile number of the terminal B.

S403: After receiving the download address information recommending request sent by the terminal A, the application server acquires a download address of the terminal application K and generates authentication information of registration according to the download address information recommending request, and records a mapping relationship between the authentication information, a terminal identifier of the terminal A, and the terminal identifier of the terminal B.

S404: The application server generates recommended download address information according to the download address of the terminal application K and the authentication information used for performing registration, and returns the recommended download address information to the terminal A.

The recommended download address information may include the download address of the terminal application K, the authentication information used for performing registration, and the like.

S405: The terminal A sends a recommending message to the terminal B after receiving the recommended download address information sent by the application server.

The recommending message may specifically be in an information format, such as an SMS message, a multimedia message, or a WeChat message, and the recommending message may carry the recommended download address information, where the recommended download address information may include the download address of terminal application K, the authentication information used for performing registration, and the like.

For example, using that the recommending message specifically is an SMS message as an example, in this case, the terminal A may send the recommending message to the terminal B through an SMS message gateway.

S406: The terminal B sends a download request to the application server according to the download address of the terminal application K after receiving the recommending message sent by the terminal A.

S407: The application server returns an installation package of the terminal application K to the terminal B according to the download request.

S408: The terminal B runs the installation package of the terminal application K after receiving the installation package of the terminal application K, so as to install the terminal application K.

S409: When the terminal application K is enabled, the terminal B sends a registration request message to the application server, where the registration request message may carry information, such as the terminal identifier of the terminal A and the authentication information (namely, the authentication information carried in the recommending message). For example, the step may specifically be as follows:

When the terminal application is enabled, the terminal B extracts the authentication information used for performing registration from the recommending message, and sends the registration request message to the application server, where the registration request carries the terminal identifier of the terminal A and the authentication information used for performing registration.

The enabling of the terminal application may be that a user actively enables the terminal application and may also be that the terminal application is automatically enabled, for example, the terminal application is wakened up by listening to a network switch broadcast.

S410: After receiving the registration request message sent by the terminal B, the application server performs authentication according to the terminal identifier of the terminal A and the authentication information; if the authentication succeeds, performs S411; and if the authentication fails, returns a response message representing that the authentication fails to the terminal B, so as to end the process. For example, the step may specifically be as follows:

Determine whether the terminal identifier of the terminal A, the authentication information, and the terminal identifier of the terminal B are consistent with the recorded mapping relationship; if consistent, it indicates that an identity of the user (namely, the terminal B) that requests registration is authorized and the authentication succeeds, perform S411; and if inconsistent, it indicates that the identity of the user (namely, the terminal B) that requests registration is unauthorized and the authentication fails.

S411: The application server returns registration information to the terminal B, where the registration information may include information, such as the terminal identifier of the terminal B and the authentication key.

The authentication key is an initial password by which the user logs in to an account of the terminal application.

S412: The terminal B sends a login request to the application server according to the terminal identifier of the terminal B and the authentication key.

S413: The application server authenticates a login operation of the terminal B according to the login request, that is, determines whether the terminal B can log in, and returns a login response to the terminal B. For example, when it is determined that the terminal B can log in, a response message representing success of the login is returned to the terminal B; or when it is determined that the terminal B cannot log in, a response message representing failure of the login to the terminal B, which is not repeatedly described herein.

It may be learned from the above that, in this embodiment, a registered user terminal A acquires authentication information, that is, an application server returns recommended download address information including a terminal application download address and the authentication information used for performing registration to the terminal A; in this way, when the terminal A sends a recommending message to a terminal B, the terminal application download address and the authentication information may be carried in the recommending message, so as to enable the terminal B to, on the one hand, download a terminal application from the application server according to the terminal application download address for installation, and on the other hand, directly initiate registration to the application server according to the authentication information when the terminal application is enabled, while a user does not need to interact with the application server for multiple times by using SMS messages to acquire the authentication information. Therefore, compared with that in the prior art, in this solution, less time is consumed, and occurrence of a case in which the registration fails due to an error in a step in the multiple times of interaction can be avoided, so as to improve a registration success rate, thereby helping to improve an application activating rate for the user, and further saving expense of the user.

Figure 5A:
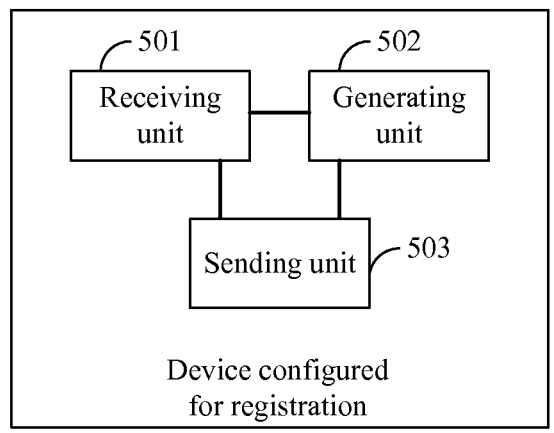
FIG. 5a is a schematic structural diagram of a device configured for registration according to an embodiment of the present invention.

To better implement the foregoing methods, an embodiment of the present invention further provides a device configured for registration, and as shown in FIG. 5a, the device configured for registration includes a receiving unit 501, a generating unit 502, and a sending unit 503.

The receiving unit 501 is configured to receive a download address information recommending request sent by a first terminal.

The download address information recommending request may carry information, such as a terminal identifier of a second terminal. The terminal identifier of the second terminal is acquired by the first terminal, and the terminal identifier may specifically be represented in various forms, such as an IMSI, an MSISDN, and an NMSI.

The generating unit 502 is configured to: according to the download address information recommending request that is received by the receiving unit, acquire a terminal application download address and generate authentication information used for performing registration, and according to the terminal application download address and the authentication information used for performing registration, generate recommended download address information, where the recommended download address information includes the terminal application download address and the authentication information used for performing registration.

The sending unit 503 is configured to return the recommended download address information to the first terminal.

The recommended download address information may include the terminal application download address and the authentication information used for performing registration, so that the first terminal sends, to the second terminal, a recommending message carrying the recommended download address information, so as to make the second terminal register according to the terminal application download address and the authentication information used for performing registration. In other words, when a subsequent sender terminal recommends a terminal application to the second terminal, the recommended download address information may be carried in the recommending message. In this way, not only the terminal application download address can be provided for the second terminal, but also the authentication information used for performing registration is also provided for the second terminal at the same time, so that the second terminal does not need to acquire the authentication information used for performing registration again.

Figure 5B:
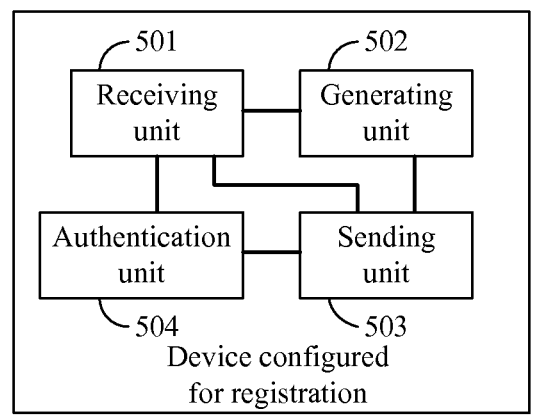
FIG. 5b is another schematic structural diagram of a device configured for registration according to an embodiment of the present invention.

As shown in FIG. 5b, the device configured for registration may further include an authentication unit 504, which may be as follows:

The receiving unit 501 is further configured to receive a download request sent by the second terminal according to the terminal application download address.

After receiving the recommending message sent by the first terminal, the second terminal may download the terminal application according to the terminal application download address in the recommended download address information which is carried in the recommending message, for example, the second terminal may send the download request to a network device, such as an application server, according to the terminal application download address.

The sending unit 503 is further configured to return an installation package of the terminal application to the second terminal according to the download request, so that the second terminal installs the terminal application.

The receiving unit 501 is further configured to receive a registration request message sent by the second terminal.

The registration request message may carry a terminal identifier of the first terminal and the authentication information, where the authentication information is the authentication information included in the recommended download address information, which is not repeatedly described herein.

The authentication unit 504 is configured to: perform authentication according to the terminal identifier of the first terminal and the authentication information; if the authentication fails, send a response message representing that the authentication fails to the second terminal by using the sending unit 503; and if the authentication succeeds, return registration information to the second terminal by using the sending unit 503.

The sending unit 503 is configured to: if the authentication fails, send the response message representing that the authentication fails to the second terminal; and if the authentication succeeds, return the registration information to the second terminal.

The registration information may include information, such as the terminal identifier of the second terminal and an authentication key (servicetoken), and in this case, after the registration information is returned to the second terminal, a login request sent by the second terminal according to the terminal identifier of the second terminal and the authentication key may further be received, a login operation is authenticated according to the login request, and a login response is returned to the second terminal, that is, the receiving unit 501 and the sending unit 503 may further perform the following operations respectively:

The receiving unit 501 is further configured to receive the login request sent by the second terminal according to the terminal identifier of the second terminal and the authentication key.

The sending unit 503 is further configured to authenticate the login operation according to the login request, and return the login response to the second terminal.

The authentication key is an initial password by which the user logs in to an account of the terminal application.

Optionally, after the authentication information used for performing registration is generated by the generating unit 502, a mapping relationship between the authentication information, the terminal identifier of the first terminal, and the terminal identifier of the second terminal may further be recorded. That is, the device configured for registration may further include a recording unit, which is as follows:

The recording unit is configured to record the mapping relationship between the authentication information, the terminal identifier of the first terminal, and the terminal identifier of the second terminal.

In this case, the authentication unit 504 may specifically be configured to: determine whether the terminal identifier of the first terminal, the authentication information and the terminal of the second terminal are consistent with the recorded mapping relationship; if consistent, it indicates that an identity of the user (namely, the second terminal) that requests registration is authorized and the authentication succeeds, in this case, return the registration information to the second terminal by using the sending unit 503; and if inconsistent, it indicates that the identity of the user (namely, the second terminal) that requests registration is unauthorized and the authentication fails, in this case, send a response message representing that the authentication fails to the second terminal by using the sending unit 503.

A device at a network side may specifically be a device, such as an application server.

In a specific implementation, the foregoing units may be implemented as independent entities, and may also be any combination, so as to be implemented as one or multiple entities. For specific implementations of the foregoing units, reference may be made to the foregoing embodiments, and therefore no further details are provided herein.

It may be learned from the above that, in this embodiment, a receiving unit 501 of a device at a network side may receive a download address information recommending request that is sent by a first terminal and carries a terminal identifier of a second terminal; then according to the download address information recommending request, a generating unit 502 acquires a terminal application download address and generates authentication information used for performing registration; a sending unit 503 returns recommended download address information to the first terminal, where the recommended download address information includes the terminal application download address and the authentication information used for performing registration, so that the first terminal sends, to the second terminal, a recommending message carrying the recommended download address information; thereafter, the receiving unit 501 may further receive a download request sent by the second terminal according to the terminal application download address; the sending unit 503 returns an installation package of a terminal application to the second terminal, so that the second terminal installs the terminal application; the receiving unit 501 receives a registration request message that is sent by the second terminal and carries a terminal identifier of the first terminal and the authentication information; an authentication unit 504 performs authentication according to the terminal identifier of the first terminal and the authentication information; and the sending unit 503 returns registration information to the second terminal when the authentication succeeds. In this solution, because the first terminal that has registered may acquire the authentication information, and the authentication information is carried in the recommending message when the recommending message is sent to the second terminal, the second terminal may directly initiate registration according to the authentication information, during which a user does not need to interact with an application server for multiple times by using SMS messages. Therefore, compared with that in the prior art, in this solution, less time is consumed, and a registration success rate is high, thereby helping to improve an application activating rate for the user, and further saving expense of the user.

Figure 6:
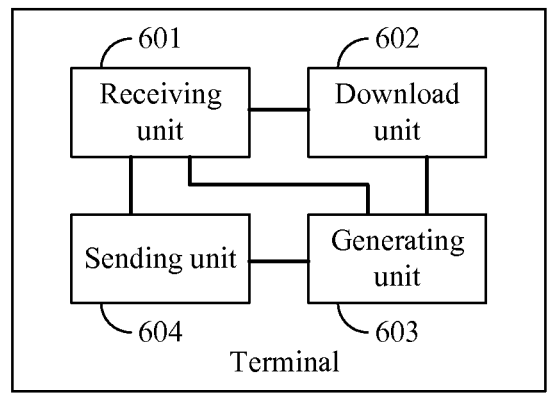
FIG. 6 is a schematic structural diagram of a terminal according to an embodiment of the present invention.

Correspondingly, an embodiment of the present invention further provides a terminal, which may be used as a second terminal in this embodiment of the present invention. As shown in FIG. 6, the terminal includes a receiving unit 601, a download unit 602, a generating unit 603, and a sending unit 604.

The receiving unit 601 is configured to receive a recommending message sent by a first terminal.

The recommending message may specifically be in an information format, such as an SMS message, a multimedia message, or a WeChat message, and the recommending message may carry recommended download address information, where the recommended download address information may include information, such as a terminal application download address and authentication information used for performing registration.

The download unit 602 is configured to download a terminal application from an application server according to the terminal application download address, and install the terminal application. For example, it may specifically be as follows:

The download unit 602 may specifically be configured to send a download request to the application server according to the terminal application download address, receive an installation package of the terminal application returned by the application server according to the download request, and run the installation package of the terminal application, so as to install the terminal application.

The generating unit 603 is configured to, when the terminal application is enabled, acquire a terminal identifier of the first terminal, generate a registration request according to the terminal identifier of the first terminal and the authentication information (namely, the authentication information carried in the recommending message), where a registration request message may carry information, such as the terminal identifier of the first terminal and the authentication information (namely, the authentication information carried in the recommending message). For example, it may specifically be as follows:

The generating unit 603 may specifically be configured to, when the terminal application is enabled, acquire the terminal identifier of the first terminal, extract the authentication information used for performing registration from the recommending message, and generate the registration request according to the terminal identifier of the first terminal and the authentication information (that is, the authentication information carried in the recommending message), where the registration request carries the terminal identifier of the first terminal and the authentication information used for performing registration.

The terminal identifier may specifically be represented in various forms, such as an IMSI, an MSISDN, and an NMSI, and the enabling of the terminal application may be that a user actively enables the terminal application and may also be that the terminal application is automatically enabled, for example, the terminal application is wakened up by listening to a network switch broadcast.

The sending unit 604 is configured to send the registration request message to the application server, where the registration request message may carry information, such as the terminal identifier of the first terminal and the authentication information (namely, the authentication information carried in the recommending message).

The receiving unit 601 is further configured to receive registration information returned after the application server performs authentication according to the terminal identifier of the first terminal and the authentication information.

The registration information may include information, such as a terminal identifier of the second terminal and an authentication key, and in this way, after receiving the registration information, the second terminal may perform a login operation according to the registration information, that is:

The sending unit 604 may further be configured to send a login request to the application server according to the terminal identifier of the second terminal and the authentication key.

The receiving unit 601 may further be configured to receive a login response returned by the application server according to the login request, which is not repeatedly described herein.

The terminal may specifically be a device, such as a smart phone or a tablet computer.

In a specific implementation, the foregoing units may be implemented as independent entities, and may also be any combination, so as to be implemented as one or multiple entities. For specific implementations of the foregoing units, reference may be made to the foregoing embodiments, and therefore no further details are provided herein.

It may be learned from the above that, according to the terminal in this embodiment, a receiving unit 601 may receive a recommending message that is sent by a first terminal and carries recommended download address information, where the recommended download address information includes a terminal application download address and authentication information used for performing registration, so as to enable the terminal to, on the one hand, download a terminal application for installation from an application server according to the terminal application download address by using the download unit 602, and on the other hand, when the terminal application is enabled, may further generate a registration request according to a terminal identifier of the first terminal and the authentication information (namely, the authentication information carried in the recommending message) by using the generating unit 603; and then, the sending unit 604 directly initiate registration to the application server, while a user does not need to interact with the application server for multiple times by using SMS messages to acquire the authentication information. Therefore, compared with that in the prior art, in this solution, less time is consumed, and occurrence of a case in which the registration fails due to an error in a step in the multiple times of interaction can be avoided, so as to improve a registration success rate, thereby helping to improve an application activating rate for the user, and further saving expense of the user.

Figure 7:
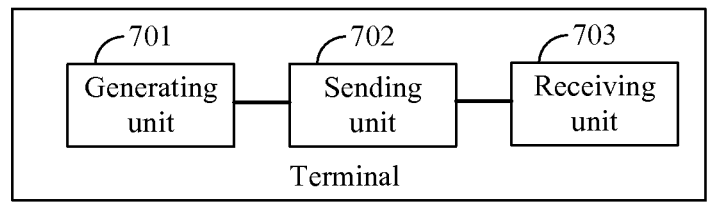
FIG. 7 is another schematic structural diagram of a terminal according to an embodiment of the present invention.

Correspondingly, an embodiment of the present invention further provides a terminal, which may be used as a second terminal in this embodiment of the present invention. As shown in FIG. 7, the terminal includes a generating unit 701, a sending unit 702, and a receiving unit 703.

The generating unit 701 is configured to acquire a terminal identifier of the second terminal, and generate a download address information recommending request according to the terminal identifier of the second terminal.

The download address information recommending request may carry information, such as the terminal identifier of the second terminal. The terminal identifier may specifically be represented in various forms, such as an IMSI, an MSISDN, and an NMSI.

The sending unit 702 is configured to send the download address information recommending request to an application server.

The receiving unit 703 is configured to receive recommended download address information returned by the application server according to the download address information recommending request.

The recommended download address information may include a terminal application download address and authentication information used for performing registration.

The sending unit 702 may further be configured to send a recommending message to the second terminal.

The recommending message may carry the recommended download address information, so as to make the second terminal download a terminal application from the application server according to the recommended download address and perform registration. For details, reference may be made to the foregoing embodiments, and therefore no further details are provided herein.

In a specific implementation, the foregoing units may be implemented as independent entities, and may also be any combination, so as to be implemented as one or multiple entities. For specific implementations of the foregoing units, reference may be made to the foregoing embodiments, and therefore no further details are provided herein.

It may be learned from the above that, according to the terminal in this embodiment, a generating unit 701 may acquire a terminal identifier of a second terminal, and generate a download address information recommending request according to the terminal identifier of the second terminal; then a sending unit 702 sends, to an application server, the download address information recommending request carrying the terminal identifier of the second terminal, so as to acquire recommended download address information, where the recommended download address information includes a terminal application download address and authentication information used for performing registration. In this way, the sending unit 72 may send, to the second terminal, a recommending message carrying the recommended download address information, so as to enable the second terminal to download a terminal application from the application server according to the recommended download address, and directly initiate registration to the application server according to the authentication information, while a user does not need to interact with the application server for multiple times by using SMS messages to acquire the authentication information. Therefore, compared with that in the prior art, in this solution, less time is consumed, and occurrence of a case in which the registration fails due to an error in a step in the multiple times of interaction can be avoided, so as to improve a registration success rate, thereby helping to improve an application activating rate for the user, and further saving expense of the user.

Figure 8:
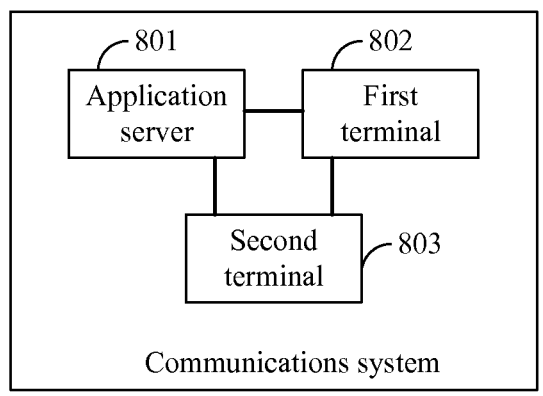
FIG. 8 is a schematic structural diagram of a communications system according to an embodiment of the present invention.

Correspondingly, an embodiment of the present invention further provides a communications system, including any device configured for registration and any terminal that are provided in the embodiments of the present invention. For example, using that the device configured for registration specifically is an application server as an example, as shown in FIG. 8, the communications system may include an application server 801, a first terminal 802, and a second terminal 803, which may specifically be as follows:

The application server 801 is configured to: receive a download address information recommending request sent by the first terminal 802, where the download address information recommending request carries a terminal identifier of the second terminal 803; according to the download address information recommending request, acquire a terminal application download address and generate authentication information used for performing registration, and according to the terminal application download address and the authentication information used for performing registration, generate recommended download address information; return the recommended download address information to the first terminal 802, where the recommended download address information includes the terminal application download address and the authentication information used for performing registration, so that the first terminal 802 sends, to the second terminal 803, a recommending message carrying the recommended download address information; receive a download request sent by the second terminal 803 according to the terminal application download address; return an installation package of a terminal application to the second terminal 803 according to the download request, so that the second terminal 803 installs the terminal application; receive a registration request message sent by the second terminal 803, where the registration request message carries a terminal identifier of the first terminal 802 and the authentication information; perform authentication according to the terminal identifier of the first terminal 802 and the authentication information; and return registration information to the second terminal 803 when the authentication succeeds.

The first terminal 802 is configured to: acquire the terminal identifier of the second terminal 803; send, to the application server 801, the download address information recommending request carrying the terminal identifier of the second terminal 803; receive the recommended download address information returned by the application server 801 according to the download address information recommending request, where the recommended download address information includes the terminal application download address and the authentication information used for performing registration; and send, to the second terminal 803, the recommending message carrying the recommended download address information, so as to enable the second terminal 803 to download the terminal application from the application server 801 and register according to the recommend download address.

The second terminal 803 is configured to: receive the recommending message that is sent by the first terminal 802 and carries the recommended download address information, where the recommended download address information includes the terminal application download address and the authentication information used for performing registration; download the terminal application from the application server 801 according to the terminal application download address, and install the terminal application; when the terminal application is enabled, send, to the application server 801, the registration request message carrying the terminal identifier of the first terminal 802 and the authentication information; and receive the registration information returned after the application server 801 performs authentication according to the terminal identifier of the first terminal 802 and the authentication information.

For specific implementations of the above devices, reference may be made to the foregoing embodiments, and therefore no further details are provided herein.

Because the communications system includes any device at a network side and any terminal that are provided in the embodiments of the present invention, the communications system can also implement benefits of any device at the network side and any terminal that are provided in the embodiments of the present invention. For details, reference may be made to the foregoing embodiments, and therefore no further details are provided herein.

Figure 9:
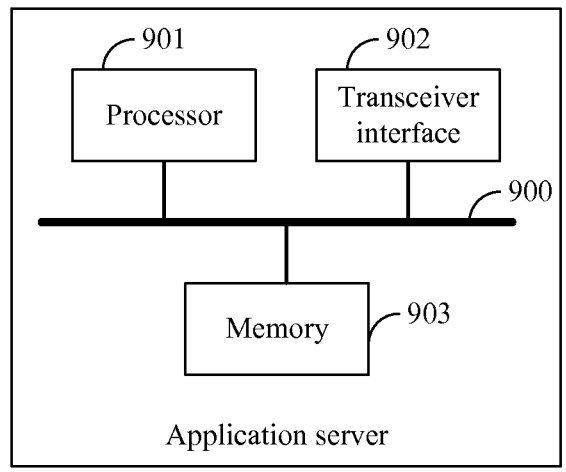
FIG. 9 is a schematic structural diagram of an application server according to an embodiment of the present invention.

In addition, an embodiment of the present invention further provides an application server. As shown in FIG. 9, the application server may include a processor 901, a transceiver interface 902, and a memory 903, where the processor 901 is connected to the transceiver interface 902 and the memory 903 through a bus (BUS) 900, and functions of parts of the application server may specifically be as follows:

The transceiver interface 902 is configured to receive a download address information recommending request sent by a first terminal, where the download address information recommending request carries a terminal identifier of a second terminal.

The processor 901 is configured to: according to the download address information recommending request received by the transceiver interface 902, acquire a terminal application download address and generate authentication information of registration, and according to the terminal application download address and the authentication information used for performing registration, generate recommended download address information, and return the recommended download address information to the first terminal by using the transceiver interface 902, where the recommended download address information include the terminal application download address and the authentication information used for performing registration, so that the first terminal sends, to the second terminal, a recommending message carrying the recommended download address information, so as to make the second terminal register according to the terminal application download address and the authentication information used for performing registration.

The memory 903 is configured to store data, and can be accessed by the processor 901 and the transceiver interface 902. The memory 903 may include a high speed random access memory, and may further include a non-volatile memory, for example, one or more magnetic disk storage components, a flash storage component, and another volatile solid-state storage component.

In addition, the transceiver interface 902 is further configured to receive a download request sent by the second terminal according to the terminal application download address, and receive a registration request message sent by the second terminal, where the registration request message carries a terminal identifier of the first terminal and the authentication information.

The processor 901 is further configured to: return an installation package of a terminal application to the second terminal by using the transceiver interface 902 according to the download request received by the transceiver interface 902, so that the second terminal installs the terminal application; perform authentication according to the terminal identifier of the first terminal and the authentication information; and return registration information to the second terminal by using the transceiver interface 902 when the authentication succeeds.

Optionally, after generating the authentication information of registration, the processor 901 may further record a mapping relationship between the authentication information, the terminal identifier of the first terminal, and the terminal identifier of the second terminal, so as to subsequently performing, according to the recorded mapping relationship in the later, authentication on an identity of a user that requests registration, that is:

The processor 901 may further be configured to, after generating the authentication information of registration, record the mapping relationship between the authentication information, the terminal identifier of the first terminal, and the terminal identifier of the second terminal.

When performing authentication according to the terminal identifier of the first terminal and the authentication information, the processor 901 may specifically be configured to: determine whether the terminal identifier of the first terminal, the authentication information, and the terminal identifier of the second terminal are consistent with the recorded mapping relationship. If consistent, it indicates that the identity of the user (namely, the second terminal) that requests registration is authorized, and the authentication succeeds; if inconsistent, it indicates that the identity of the user (namely, the second terminal) that requests registration is unauthorized, and the authentication fails.

In addition, the transceiver interface 902 may further be configured to receive a login request sent by the second terminal according to the terminal identifier of the second terminal and an authentication key, and return a login response to the second terminal.

In this case, the processor 901 may further be configured to authenticate a login operation according to the login request received by the transceiver interface 902, and control the transceiver interface 902 to return the login response to the second terminal.

For specific implementations of the above parts, reference may be made to the foregoing embodiments, and therefore no further details are provided herein.

It may be learned from the above that, according to the application server in this embodiment, a download address information recommending request that is sent by a first terminal and carries a terminal identifier of a second terminal is received; then according to the download address information recommending request, a terminal application download address is acquired and authentication information used for performing registration is generated; recommended download address information is returned to the first terminal, where the recommended download address information includes the terminal application download address and the authentication information used for performing registration, so that the first terminal sends, to the second terminal, a recommending message carrying the recommended download address information; thereafter, a download request sent by the second terminal according to the terminal application download address may be received; an installation package of a terminal application is returned to the second terminal, so that the second terminal installs the terminal application; a registration request message that is sent by the second terminal and carries a terminal identifier of the first terminal and the authentication information is received; authentication is performed according to the terminal identifier of the first terminal and the authentication information; and registration information is returned to the second terminal when the authentication succeeds. In this solution, because the first terminal that has registered may acquire the authentication information, and the authentication information is carried in the recommending message when the recommending message is sent to the second terminal, the second terminal may directly initiate registration according to the authentication information, during which a user does not need to interact with the application server for multiple times by using SMS messages. Therefore, compared with that in the prior art, in this solution, less time is consumed, and a registration success rate is high, thereby helping to improve an application activating rate for the user, and further saving expense of the user.

Figure 10:
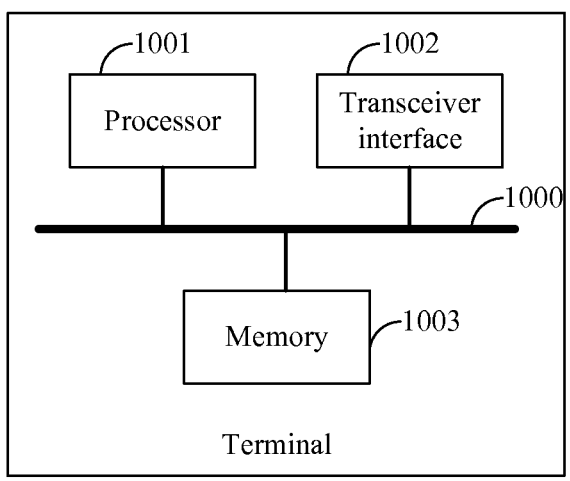
FIG. 10 is still another schematic structural diagram of a terminal according to an embodiment of the present invention.

Correspondingly, an embodiment of the present invention further provides a terminal, which may be used as a second terminal in this embodiment of the present invention. As shown in FIG. 10, the terminal may include a processor 1001, a transceiver interface 1002, and a memory 1003, where the processor 1001 is connected to the transceiver interface 1002 and the memory 1003 through a bus 1000, and functions of parts of the terminal may specifically be as follows:

The transceiver interface 1002 is configured to receive a recommending message that is sent by a first terminal and carries recommended download address information, where the recommended download address information include a terminal application download address and authentication information used for performing registration; send, to an application server and under the control of the processor 1001, a registration request message carrying a terminal identifier of the first terminal and the authentication information; and receive registration information returned after the application server performs authentication according to the terminal identifier of the first terminal and the authentication information.

The registration information may include information, such as a terminal identifier of the second terminal and an authentication key.

The processor 1001 is configured to download a terminal application from the application server according to the terminal application download address received by the transceiver interface 1002, and install the terminal application; when the terminal application is enabled, acquire the terminal identifier of the first terminal, generate a registration request according to the terminal identifier of the first terminal and the authentication information (namely, the authentication information carried in the recommending message); and control the transceiver interface 1002 to send, to the application server, the registration request message carrying the terminal identifier of the first terminal and the authentication information.

The memory 1003 is configured to store data, and can be accessed by the processor 1001 and the transceiver interface 1002. The memory 1003 may include a high speed random access memory, and may further include a non-volatile memory, for example, one or more magnetic disk storage components, a flash storage component, and another volatile solid-state storage component.

The transceiver interface 1002 may further be configured to receive an installation package of the terminal application sent according to a download request by the application server.

The processor 1001 may specifically be configured to control the transceiver interface 1002 to send the download request to the application server according to the terminal application download address, and after the transceiver interface 1002 receives the installation package of the terminal application returned by the application server according to the download request, run the installation package of the terminal application, so as to install the terminal application.

For specific implementations of the above parts, reference may be made to the foregoing embodiments, and therefore no further details are provided herein.

It may be learned from the above that, according to the terminal in this embodiment, a recommending message that is sent by a first terminal and carries recommended download address information may be received, where the recommended download address information includes a terminal application download address and authentication information used for performing registration, so as to enable the second terminal to, on the one hand, download a terminal application for installation from an application server according to the terminal application download address, and on the other hand, directly initiate registration to the application server according to the authentication information when the terminal application is enabled, while a user does not need to interact with the application server for multiple times by using SMS messages to acquire the authentication information. Therefore, compared with that in the prior art, in this solution, less time is consumed, and occurrence of a case in which the registration fails due to an error in a step in the multiple times of interaction can be avoided, so as to improve a registration success rate, thereby helping to improve an application activating rate for the user, and further saving expense of the user.

A person of ordinary skill in the art may understand that all or a part of the steps of the methods in the embodiments may be implemented by a program instructing relevant hardware. The program may be stored in a computer readable storage medium. The storage medium may include: a read-only memory (ROM, Read Only Memory), a random access memory (RAM, Random Access Memory), a magnetic disk, an optical disc, or the like.

The above describes a method, a device, and a system for registering a terminal application provided in the embodiments of the present invention in detail. Although the principle and implementation manners of the present invention are described with reference to the specific embodiments, the embodiments are only intended to help understand the method and core idea of the present invention. In addition, with respect to the specific implementation manners and an application scope of the present invention, modifications and variations may be made by persons skilled in the art according to the idea of the present invention. Therefore, the specification shall not be construed as a limitation on the present invention.

What is claimed is:

1. A method for registering a terminal application, comprising:

receiving a download address information recommending request sent by a first terminal, the download address information recommending request comprising a terminal identifier of a second terminal;

according to the download address information recommending request, acquiring a terminal application download address and generating, for the second terminal, authentication information used for performing registration by the second terminal;

recording a mapping relationship between the authentication information, a terminal identifier of the first terminal, and the terminal identifier of the second terminal;

generating recommended download address information, the recommended download address information comprising the terminal application download address and the authentication information used for performing registration after the second terminal downloads the terminal application; and returning the recommended download address information to the first terminal;

sending, by the first terminal to the second terminal, a recommending message comprising the recommended download address information;

downloading and installing, by the second terminal, the terminal application according to the terminal application download address;

performing the registration, by the second terminal after the downloading and installing, according to the authentication information used for performing registration, in response to the registration, receiving, by the second terminal registration information including an authentication key used by the second terminal for logging in to a user account of the terminal application.

2. The method according to claim 1, wherein the downloading, installing, and performing the registration comprises:
receiving a download request sent by the second terminal according to the terminal application download address;
returning an installation package of a terminal application to the second terminal according to the download request, so that the second terminal installs the terminal application;
receiving a registration request message sent by the second terminal, the registration request message comprising the terminal identifier of the first terminal and the authentication information;
performing authentication according to the terminal identifier of the first terminal and the authentication information; and
returning the registration information to the second terminal when the authentication succeeds.

3. The method according to claim 2, wherein the performing authentication according to the terminal identifier of the first terminal and the authentication information comprises:
determining whether the terminal identifier of the first terminal, the authentication information, and the terminal identifier of the second terminal are consistent with the recorded mapping relationship;
determining that the authentication succeeds upon determining that the terminal identifier of the first terminal, the authentication information, and the terminal identifier of the second terminal are consistent with the recorded mapping relationship; and
determining that the authentication fails upon determining that the terminal identifier of the first terminal, the authentication information, and the terminal identifier of the second terminal are inconsistent with the recorded mapping relationship.

4. The method according to claim 2, wherein the registration information further comprises the terminal identifier of the second terminal, and after the returning registration information to the second terminal, the method further comprises:
receiving a login request sent by the second terminal according to the terminal identifier of the second terminal and the authentication key; and
authenticating a login operation according to the login request, and returning a login response to the second terminal.

5. A method for registering a terminal application, comprising:
receiving, by a second terminal, a recommending message sent by a first terminal, the recommending message comprising a recommended download address information, and the recommended download address information comprising a terminal application download address and authentication information used for performing registration after installation of the terminal application, the authentication information having a recorded mapping relationship to a terminal identifier of the first terminal and a terminal identifier of the second terminal;
downloading, by the second terminal a terminal application from an application server according to the terminal application download address;
installing, by the second terminal, the terminal application;
after the installing the terminal application, when the terminal application is enabled by the second terminal:
acquiring the terminal identifier of the first terminal;
generating a registration request according to the terminal identifier of the first terminal and the authentication information used for performing registration; and
sending a registration request message to the application server, the registration request message comprising the terminal identifier of the first terminal and the authentication information; and
receiving registration information returned after the application server performs authentication according to the terminal identifier of the first terminal and the authentication information, the registration information comprising an authentication key for logging in to a user account of the terminal application.

6. The method according to claim 5, wherein the acquiring a terminal identifier of the first terminal, and generating a registration request according to the terminal identifier of the first terminal and the authentication information used for performing registration comprises:
when the terminal application is enabled, acquiring the terminal identifier of the first terminal and extracting the authentication information used for performing registration from the recommending message; and
generating the registration request according to the terminal identifier of the first terminal and the authentication information used for performing registration, the registration request message comprises the terminal identifier of the first terminal and the authentication information.

7. The method according to claim 5, wherein the registration information further comprises a terminal identifier of a second terminal, and after the receiving registration information returned after the application server performs authentication according to the terminal identifier of the first terminal and the authentication information, the method further comprises:
sending a login request to the application server according to the terminal identifier of the second terminal and the authentication key; and
receiving a login response returned by the application server according to the login request.

8. A device comprising:
at least one hardware processor;
a memory interfaced to the at least one hardware processor, the memory including instructions controlling the at least one hardware processor to:
receive a download address information recommending request sent by a first terminal, wherein the download address information recommending request carries a terminal identifier of a second terminal;
according to the download address information recommending request that is received by the receiving unit, acquire a terminal application download address and generate authentication information used for performing registration by the second terminal;
record a mapping relationship between the authentication information, a terminal identifier of the first terminal, and the terminal identifier of the second terminal;
generate recommended download address information, the recommended download address information comprising the terminal application download address and the authentication information used for performing registration after the second terminal downloads the terminal application;

return the recommended download address information to the first terminal, so that the first terminal sends, to the second terminal, a recommending message carrying the recommended download address information, so as to make the second terminal perform registration, after downloading and installing the terminal application, according to the authentication information used for performing registration, and upon receiving a registration request message send by the second terminal and authenticating the second terminal, sending registration information to the second terminal, the registration information comprising an authentication key for logging in to a user account of the terminal application.

9. The device according to claim 8, wherein the instructions further control the at least one hardware processor to:

receive a download request sent by the second terminal according to the terminal application download address;

return an installation package of a terminal application to the second terminal according to the download request, so that the second terminal installs the terminal application;

receive the registration request message sent by the second terminal, the registration request message comprising the terminal identifier of the first terminal and the authentication information;

perform authentication according to the terminal identifier of the first terminal and the authentication information; and when the authentication fails, send the response message representing that the authentication fails to the second terminal, and when the authentication succeeds in the authentication unit, return the registration information to the second terminal.

10. The device according to claim 9, wherein the instructions further control the at least one hardware processor to:

determine whether the terminal identifier of the first terminal, the authentication information, and the terminal identifier of the second terminal are consistent with the recorded mapping relationship;

determine that the authentication succeeds upon determining that the terminal identifier of the first terminal, the authentication information, and the terminal identifier of the second terminal are consistent with the recorded mapping relationship; and determine that the authentication fails upon determining that the terminal identifier of the first terminal, the authentication information, and the terminal identifier of the second terminal are inconsistent with the recorded mapping relationship.

11. The device according to claim 9, wherein the instructions further control the at least one hardware processor to:

receive a login request sent by the second terminal according to the registration information, the registration information further comprising the terminal identifier of the second terminal; and authenticate a login operation according to the login request, and return a login response to the second terminal.

12. A terminal, comprising:

at least one hardware processor;

a memory interfaced to the at least one hardware processor, the memory including instructions controlling the at least one hardware processor to:

receive a recommending message sent by a first terminal, the recommending message comprising a recommended download address information, and the recommended download address information comprising a terminal application download address and authentication information used for performing registration after installation of the terminal application, the authentication information having a recorded mapping relationship to a terminal identifier of the first terminal and a terminal identifier of the terminal;

download a terminal application from an application server according to the terminal application download address;

install the terminal application;

after the terminal application is installed, when the terminal application is enabled:

acquire the terminal identifier of the first terminal;

generate a registration request according to the terminal identifier of the first terminal and the authentication information used for performing registration, the registration request message comprising the terminal identifier of the first terminal and the authentication information;

send the registration request message to the application server; and receive registration information returned after the application server performs authentication according to the terminal identifier of the first terminal and the authentication information, the registration information comprising an authentication key for logging in to a user account of the terminal application.

13. The terminal according to claim 12, wherein the instructions further control the at least one hardware processor to:

when the terminal application is enabled, acquire the terminal identifier of the first terminal, extract the authentication information used for performing registration from the recommending message, and generate the registration request according to the terminal identifier of the first terminal and the authentication information used for performing registration, the registration request message comprising the terminal identifier of the first terminal and the authentication information.

14. The terminal according to claim 12, wherein the instructions further control the at least one hardware processor to:

send a login request to the application server according to the registration information, the registration information further comprising a terminal identifier of a second terminal; and receive a login response returned by the application server according to the login request.

* * * * *